C. G. ROBERTON.
THRUST BEARING.
APPLICATION FILED MAR. 5, 1921.
1,396,880.
Patented Nov. 15, 1921.
2 SHEETS—SHEET 1.
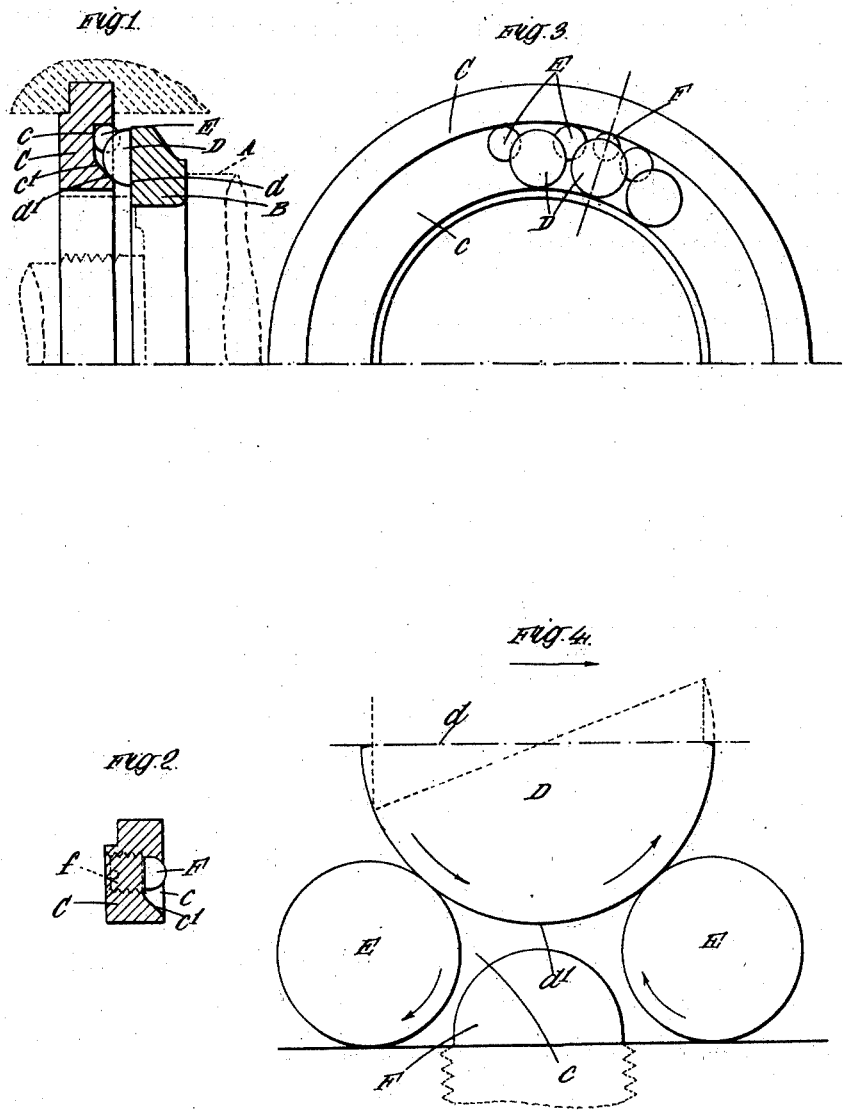

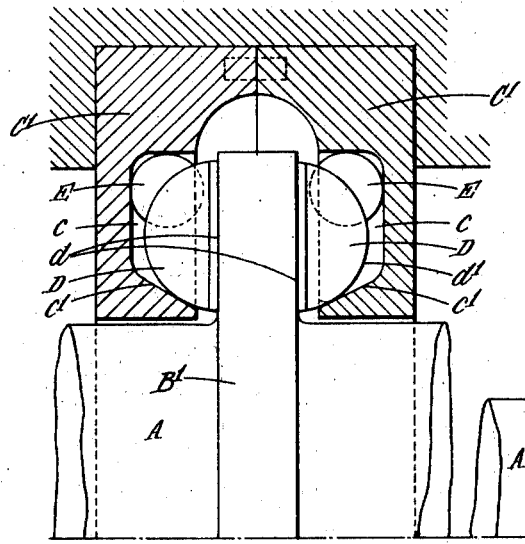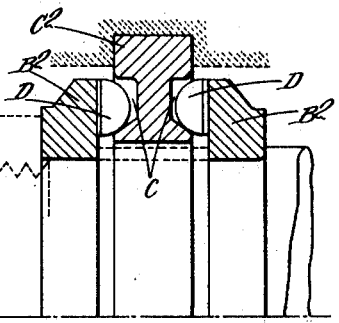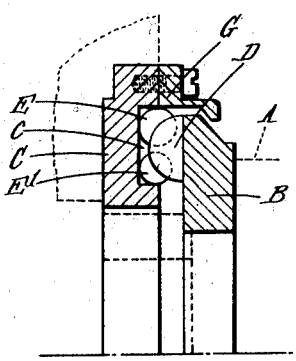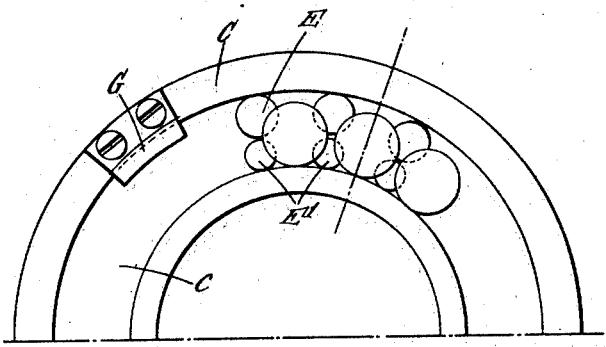

UNITED STATES PATENT OFFICE.

CHARLES G. ROBERTON, OF BARROW-IN-FURNESS, ENGLAND.

THRUST-BEARING.

1,396,880. Specification of Letters Patent. Patented Nov. 15, 1921.

Application filed March 5, 1921. Serial No. 450,050.

(GRANTED UNDER THE PROVISIONS OF THE ACT OF MARCH 3, 1921, 41 STAT. L., 1313.)

*To all whom it may concern:*

Be it known that I, CHARLES GEORGE ROBERTON, a subject of the King of Great Britain, residing at Naval Construction Works, Barrow-in-Furness, in the county of Lancaster, England, have invented certain new and useful Improvements in or Relating to Thrust-Bearings, (for which I have filed an application in Great Britain No. 24384, on October 6, 1919,) of which the following is a specification.

This invention relates to thrust bearings of the oil film lubrication type in which separate bearing blocks or pads meet a continuous bearing surface.

According to this invention each bearing block or pad is made with a spherical rear surface and is supported at either three or four points distributed around the center of the pad, the support at two points at least being upon balls and providing for angular freedom of the pad to allow the latter to accommodate itself to the conditions of the bearing.

The blocks or pads may be regarded as large balls one side of which is cut away or flattened to produce the flat bearing surface. The radius or curvature of the spherical surface must not be small enough to produce undue side thrusts on the balls.

In order that the said invention may be clearly understood and readily carried into effect, I will now describe the same more fully with reference to the accompanying drawings, in which:—

Figure 1 is a cross section through part of a bearing embodying this invention.

Fig. 2 is a sectional detail view of part of the bearing.

Fig. 3 is an elevation of the bearing.

Fig. 4 is a diagrammatic view showing the manner in which the bearing blocks tilt.

Fig. 5 is a sectional view of a double thrust single collar bearing.

Fig. 6 is a sectional view of a double thrust bearing with two thrust collars; and Figs. 7 and 8 are respectively a sectional view and an elevation showing a modification of the bearing in which the bearing pads are supported on four balls.

A is the shaft supported in the bearing and provided with a thrust ring B. C is a fixed bearing member having a channel $c$ in its face. D, D are the bearing pads having flat bearing faces $d$ and spherical rear faces $d'$ these bearing pads lying partly inside the channel or track $c$. E, E are the supporting balls against which the pads bear. F is a stop or stud shown in Fig. 2, which may take the place of one of the balls E and is adjustably screwed at $f$ into the bearing C, the stop preventing the balls E and bearing pads D from revolving in the bearing.

In the construction of bearing shown in Figs. 1, 2 and 3, the pads D are each supported at three points, two of which are provided by the outer ring of balls E lying in the outer portion of the channel $c$, while the inner side of this channel is formed with a sloping surface $c'$, against which the spherical face of the pads D rests at a single point. Each of the balls E lies between a pair of pads D and the pads, while prevented from free rotation in the channel $c$ by the stop F, placed at any convenient point in the channel, are free to adjust themselves to forward or backward rotation of the shaft A by the play allowed between the pads and the points of support.

In a bearing of this class the bearing pads should be free to adjust the bearing surfaces through a very small angle which allows the lubricating oil to enter between the stationary and rotating bearing surfaces and in the present construction the spherical rear faces of the pads permit the pads to open slightly at the entrance edge of their bearing faces, the action being the same for both directions of motion, so that on reversal of the shaft the pads reverse their opening action, facilitating the entry of the lubricant in the well-known manner. This is illustrated in an exaggerated form in Fig. 4, where the arrows show the direction of movement of the moving bearing face and the direction of adjustment of the pads and supporting balls when such movement begins, causing the flat bearing face $d$ of the pads to take up an angular position, shown in dotted lines. It is to be understood, however, that this angle is extremely small, causing only a slight difference in the thickness of the oil film, as it passes from the entering to the leaving edge of the pad. Owing to the spherical form of the back surfaces of the pad, the angular adjustment is around the center of the sphere, *i. e.*, if the pads are hemispherical as shown in the diagram, Fig. 4, the adjustment is around the center of the bearing surfaces.

In the modification of the bearing shown in Fig. 5, the shaft A is provided with a single thrust collar B', on both sides of which is the double bearing C", each member carrying the set of pads D and supporting balls E, arranged in the manner shown in Figs. 1 and 3. The single bearing therefore takes the thrust in both directions.

Fig. 6 shows a modification in which the shaft A is provided with a pair of thrust collars B² encircling a single central bearing C², provided on each side with the channels c and a set of bearing pads D, which may be supported on an outer ring of balls and an inner sloping face in the manner already described.

Figs. 7 and 8 are similar views to Figs. 1 and 3, but show a modification in which the bearing pads are supported at four points by an outer ring of balls E, corresponding to the balls shown on the other modifications, and an inner ring of balls E', which are preferably of smaller diameter as they support the pads at points nearer the center of the bearing. In this case, the channel c of the bearing C is not provided with the sloping supporting face c', the inner ring of balls E' taking the place of this supporting face. The balls E' each assist in supporting two adjacent pads, as do the balls E, and the pads are free to adjust themselves in any angular direction, so as to provide for the opening of the pads at the entrance edge, as already described with reference to Fig. 4.

To retain the thrust collar B in place in the bearing, the latter may be provided with a number of clips G, of which one is shown in Figs. 7 and 8, screwed to the face of the bearing C and having lips extending over the edge of the thrust collar B. The bearing is provided with a stop such as F shown in Fig. 2, to prevent displacement of the pads and balls.

What I claim and desire to secure by Letters Patent of the United States is:—

1. In a thrust bearing of the kind set forth, a plurality of bearing blocks each having a flat bearing surface and a part spherical rear surface, and a three point support for the spherical surfaces of the said blocks, the three points of which are distributed substantially concentrically of the block.

2. In a thrust bearing of the kind set forth, a plurality of bearing blocks each having a flat bearing surface and a part spherical rear surface, and a multiple point support for the spherical surfaces of the said blocks, of which at least two points of support are on rotary rolling members.

3. In a thrust bearing of the kind set forth, a plurality of bearing blocks each having a flat bearing surface and a part spherical rear surface, and a multiple point support for the spherical surfaces of the said block, of which at least two points of support are on balls.

4. In a thrust bearing of the kind set forth, a plurality of bearing blocks each having a flat bearing surface and a part spherical rear surface, a channeled bearing member carrying the said blocks and provided with a bearing face against which the spherical surfaces of the blocks bear at one point and a set of rolling members giving a further pair of points of support to each spherical surface.

5. In a thrust bearing of the kind set forth, a plurality of bearing blocks each having a flat bearing surface and a part spherical rear surface, a channeled bearing member carrying the said blocks and provided with a bearing face against which the spherical surfaces of the blocks bear at one point and a set of rolling members lying within the channel of the said bearing member and giving a further pair of points of support to each spherical surface.

6. In a thrust bearing of the kind set forth a plurality of bearing blocks each having a flat bearing surface and a part spherical rear surface, supporting balls each placed between a pair of adjacent blocks to form two points of support for each spherical surface at one side of the said surface and supporting means for the other side of the said blocks.

7. In bearing as claimed in claim 2, a stop situated between a pair of the said rolling members to prevent the members and the blocks revolving in the bearing.

8. In a bearing as claimed in claim 3, a stop situated between a pair of the said supporting balls to prevent the balls and blocks revolving in the bearing.

9. A thrust bearing for shafts comprising a collar on the shaft, a fixed bearing member encircling the shaft and having an annular channel in the face opposite to the said collar, a plurality of bearing blocks arranged in the annular channel and having flat bearing faces meeting the shaft collar, each of the said blocks having a part spherical back surface and a multiple point support for the spherical surfaces of the blocks, of which at least two points of support are on rotary rolling members.

CHAS. G. ROBERTON.